(12) United States Patent
Pfeifle

(10) Patent No.: US 9,970,771 B2
(45) Date of Patent: May 15, 2018

(54) NAVIGATIONAL DATABASE UPDATE PACKAGE

(71) Applicant: HERE Global B.V., Eindhoven (NL)

(72) Inventor: Martin Pfeifle, Seewald (DE)

(73) Assignee: HERE Global B.V., Eindhoven (NL)

( * ) Notice: Subject to any disclaimer, the term of this patent is extended or adjusted under 35 U.S.C. 154(b) by 0 days. days.

(21) Appl. No.: 15/014,597

(22) Filed: Feb. 3, 2016

(65) Prior Publication Data

US 2017/0219357 A1    Aug. 3, 2017

(51) Int. Cl.
*G01C 21/32* (2006.01)
*G01C 21/26* (2006.01)
(Continued)

(52) U.S. Cl.
CPC ............. *G01C 21/28* (2013.01); *G01C 21/32* (2013.01); *G06F 17/30174* (2013.01); *G06F 17/30241* (2013.01); *G06F 17/30575* (2013.01)

(58) Field of Classification Search
CPC .... G01C 21/3446; G01C 21/26; G01C 21/30; G01C 21/3476; G01C 21/3492; G01C 21/3611; G01C 21/3644; G01C 21/3655; G01C 21/3415; G01C 21/34; G01C 21/36; G01C 21/32; G06F 19/321; G06F 21/6245; G06F 17/30312; G06F 3/0484; G06F 11/3409; G06Q 30/0282; G06Q 10/06; G06Q 50/32; G06Q 40/06
USPC ....... 701/410, 450, 532, 533, 451, 400, 408, 701/420, 538, 519, 501, 534, 452, 424, 701/446
See application file for complete search history.

(56) References Cited

U.S. PATENT DOCUMENTS 5,502,640 A    3/1996  Yagyu et al.
5,845,228 A    12/1998 Uekawa et al.
(Continued)

FOREIGN PATENT DOCUMENTS

EP    2339481    6/2011
GB    2351167    12/2000

OTHER PUBLICATIONS

Chawathe et al., Change Detection in Hierarchically Structured Information, Accessed Aug. 17, 2013, Department of Computer Science, Stanford University.
(Continued)

*Primary Examiner* — Jelani A Smith
*Assistant Examiner* — Luis A Martinez Borrero
(74) *Attorney, Agent, or Firm* — Alston & Bird LLP

(57) ABSTRACT

A method or apparatus for performing map updates includes two stages for reducing a size of the update package. A first navigation database having a first set of navigation data records and a first index section and a second navigation database having a second set of navigation data records and a second index section are identified. In a first stage, a first subset of the first set of navigation data records and a corresponding second subset of the second set of navigation data records are identified using a first difference operation. The first subset and second subset correspond to records that have changed between the first and second sets of navigation data records. In a second stage, a second difference operation is performed on the first subset and the second subset. The update package is generated based on a result of the difference operation.

19 Claims, 15 Drawing Sheets

(51) Int. Cl.
*G01C 21/28* (2006.01)
*G06F 17/30* (2006.01)

(56) References Cited

U.S. PATENT DOCUMENTS

| | | | |
|---|---|---|---|
| 6,260,042 B1 | 7/2001 | Curbera et al. | |
| 6,473,770 B1 | 10/2002 | Livshutz et al. | |
| 6,546,334 B1* | 4/2003 | Fukuchi | G01C 21/26 342/357.31 |
| 6,615,219 B1 | 9/2003 | Bruso et al. | |
| 6,741,929 B1 | 5/2004 | Oh et al. | |
| 7,082,443 B1* | 7/2006 | Ashby | G01C 21/32 342/357.41 |
| 7,461,077 B1* | 12/2008 | Greenwood | G06F 3/0482 |
| 7,920,964 B2* | 4/2011 | Nomura | G01C 21/3611 340/988 |
| 7,957,894 B2 | 6/2011 | Wellmann | |
| 8,055,620 B2* | 11/2011 | Nakamura | G01C 21/32 455/899 |
| 8,572,033 B2 | 10/2013 | Shukla | |
| 8,886,599 B2* | 11/2014 | Wellman | G06F 17/30241 707/620 |
| 9,015,200 B2 | 4/2015 | Pfeifle et al. | |
| 9,053,107 B1* | 6/2015 | Le | G06F 17/30174 |
| 9,122,741 B1* | 9/2015 | McAlister | G06F 17/30595 |
| 9,256,659 B1* | 2/2016 | Willett | G06F 17/30575 |
| 9,519,664 B1* | 12/2016 | Kharatishvili | G06F 17/30321 |
| 9,613,120 B1* | 4/2017 | Kharatishvili | G06F 17/30575 |
| 9,710,505 B1* | 7/2017 | McAlister | G06F 17/30321 |
| 9,798,740 B2* | 10/2017 | Pfeifle | G06F 17/30241 |
| 2004/0135705 A1 | 7/2004 | Umezu et al. | |
| 2006/0282457 A1 | 12/2006 | Williams | |
| 2007/0129885 A1 | 6/2007 | Wellmann | |
| 2008/0109443 A1 | 5/2008 | Tokui et al. | |
| 2008/0201070 A1 | 8/2008 | Kikuchi | |
| 2009/0024656 A1* | 1/2009 | Wellman | G06F 17/30241 |
| 2009/0030606 A1 | 1/2009 | Pfeifle et al. | |
| 2009/0248758 A1* | 10/2009 | Sawai | G01C 21/32 |
| 2009/0276771 A1 | 11/2009 | Nickolov et al. | |
| 2010/0017108 A1* | 1/2010 | Nakamura | G01C 21/32 701/532 |
| 2010/0077387 A1 | 3/2010 | Callaghan et al. | |
| 2010/0131198 A1* | 5/2010 | Chang | G01C 21/30 701/533 |
| 2010/0274472 A1* | 10/2010 | Sakai | G01C 21/32 701/532 |
| 2010/0299055 A1* | 11/2010 | Hilbrandie | G01C 21/32 701/532 |
| 2011/0106431 A1* | 5/2011 | Tonnobe | G01C 21/32 701/533 |
| 2011/0191285 A1* | 8/2011 | Sawai | G01C 21/32 707/602 |
| 2012/0011178 A1 | 1/2012 | Pfeifle et al. | |
| 2012/0036150 A1 | 2/2012 | Richter et al. | |
| 2013/0006925 A1* | 1/2013 | Sawai | G01C 21/32 707/609 |
| 2013/0076766 A1* | 3/2013 | Yamagishi | G01C 21/32 345/522 |
| 2013/0096829 A1* | 4/2013 | Kato | G01C 21/32 701/533 |
| 2013/0159974 A1 | 6/2013 | Norton et al. | |
| 2014/0081922 A1* | 3/2014 | Kunath | G06F 17/30241 707/679 |
| 2014/0101096 A1* | 4/2014 | Pfeifle | G06F 17/30575 707/609 |
| 2016/0061615 A1* | 3/2016 | Takahata | G01C 21/32 701/532 |
| 2016/0188641 A1* | 6/2016 | Pfeifle | G06F 17/30241 707/756 |
| 2017/0091226 A1* | 3/2017 | Kharatishvili | G06F 17/30283 |
| 2017/0308568 A1* | 10/2017 | Laethem | G06F 17/30377 |
| 2018/0039665 A1* | 2/2018 | Pfeifle | G06F 17/30356 |

OTHER PUBLICATIONS

International Search Report and Written Opinion cited in PCT/EP2013/070792, dated Jan. 8, 2014.
Wellmann, Route Search with Tile-Generated Rank, Power Point presentation, Feb. 1, 2006, 53 pages, Harman/Becker.
PCT International Search Report and Written Opinion of the International Searching Authority dated Apr. 7, 2017 for corresponding PCT/EP2017/051998.

* cited by examiner

| Index | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Patch Size for Best Matching | 50 | 46 | 75 | 73 | 99 | 75 | 24 | 65 | 43 | 73 | 83 | 67 | 53 | 22 | 234 | 441 | 245 |
| Best Matching Old Block Number | 1 | 1 | 1 | 1 | 1 | 4 | 2 | 2 | 2 | 2 | 2 | 3 | 3 | 3 | 1 | 5 | 2 |
| Best Matching Old Block Size | 8 | 8 | 8 | 8 | 8 | 2 | 8 | 8 | 8 | 8 | 8 | 3 | 3 | 3 | 8 | 2 | 8 |

FIG. 9

NAVIGATIONAL DATABASE UPDATE PACKAGE

FIELD

The following disclosure relates to map updates, and more particularly to map updates of a geographic database using a binary difference.

BACKGROUND

Map databases are used in computer-based systems that provide useful features. For example, map databases are used in the identification of routes to destinations or points of interests. A navigation system determines the optimum route to be taken by the end user to travel from the origin to the destination location from map data stored in a geographic (or map) database. Map databases are also used in driver assistance systems or driverless systems. Map databases are also used in systems that improve vehicle fuel economy, such as systems that optimize transmission gear selection taking into account upcoming slope and speed changes.

As new roads are built, other roads are closed, or locations of business are changed, the geographic database is updated. One way to update map data is to replace the entire existing map database with a new version of the geographic database containing new, updated map data. This technique requires significant time and significant bandwidth if done over a network. Incremental map updating is one of the key features of modern navigation systems. Efforts in improving incremental map update techniques are ongoing.

SUMMARY

In one embodiment, an update package for a navigation database is created from a method including identifying a first navigation database having a first plurality of navigation data records and a first index section, identifying a second navigation database having a second plurality of navigation data records and a second index section, performing a comparison the first plurality of navigation data records and the second plurality of navigation data records, and identifying, based on the comparison, a first subset of the first plurality of navigation data records and a corresponding second subset of the second plurality of navigation data records, wherein the first subset and second subset correspond to records that have changed between the first and second plurality of navigation data records. A difference operation is performed on the first subset and the second subset and the update package is generated based on a result of the difference operation.

In another embodiment, an apparatus includes an apparatus comprising at least one processor, and at least one memory including computer program code for one or more programs, the at least one memory and the computer program code configured to, with the at least one processor, cause the apparatus to at least perform identifying a first navigation database having a first plurality of navigation data records and a first index section, wherein the first plurality of navigation data records include road segment data and road attribute data, identifying a second navigation database having a second plurality of navigation data records and a second index section, performing a first different operation to identify a first subset of the first plurality of navigation data records and a corresponding second subset of the second plurality of navigation data records, wherein the first subset and second subset correspond to records that have changed between the first and second plurality of navigation data records, performing a second difference operation on the first subset and the second subset, and generating an update package based on a result of the second difference operation.

BRIEF DESCRIPTION OF THE DRAWINGS

Exemplary embodiments of the present invention are described herein with reference to the following drawings.

FIG. 9 illustrates an example data block array.

DETAILED DESCRIPTION

Incremental map updating is one of the key features of modern navigation systems. Modern navigation databases may adhere to a database standard such as the Navigation Database Standard (NDS). The navigation database may include map components such as routing records, place name records, and basic map display (BMD) records. The map components or navigation records may be organized in binary large objects (BLOBs). The navigation database may include specialized components such as a speech recognition algorithm. In order to keep a database in synchronization, both the map components or database files which accord NDS, and the specialized components or database files are updated.

Significant efforts have been directed toward update techniques for navigation databases on embedded devices, including mobile phones or head units in vehicles. Navigation databases may need to be updated frequently, such as monthly, weekly or daily. As the amount of navigation related content and features on these devices increases, so does the size of the database. As a consequence, keeping the databases up to date with changes in locations, points of interests, and road network require large file sizes and updates have been taking longer to execute.

Figure 1:
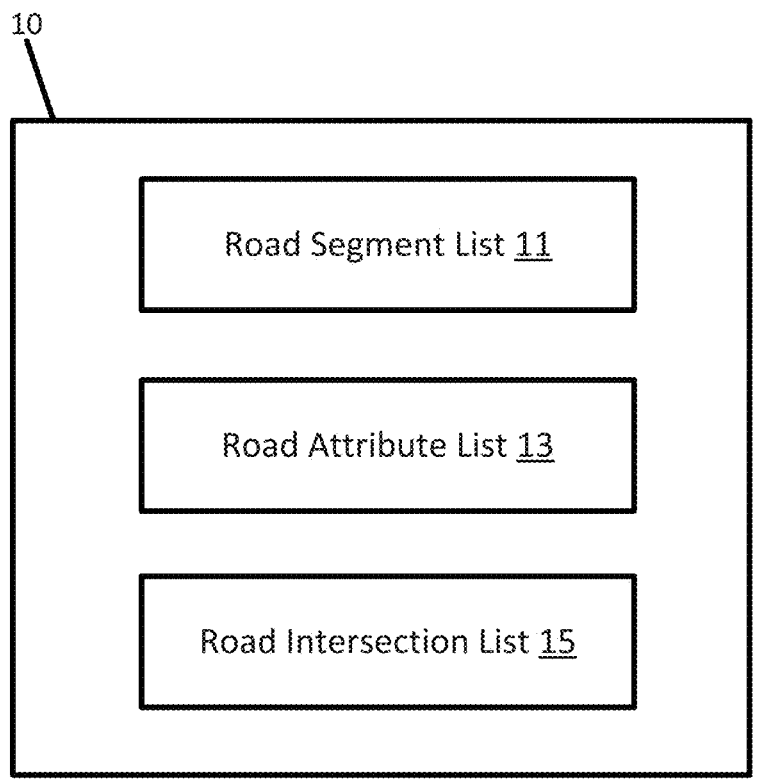
FIG. 1 illustrates an example data structure for navigational databases.

Routing or basic map display data may be organized in BLOBs (binary large objects). The content of these BLOBs may include "metadata" and "payload" data which is often organized in lists. FIG. 1 illustrates a BLOB structure 10 for the main routing function of a navigation database, which may be referred to as the routing tile. The routing tile includes metadata and payload. As illustrated, the metadata includes the routing tile header and the payload includes various list structures such as road segment list 11, road attribute list 13, and road intersection list 15. A navigation file (e.g., SQLite file) may include dozens to thousands of BLOBs in tables. In the navigational database standard (NDS), for example, an NDS database may consist of one or more SQLite files containing the navigational content and one or more speech recognition files (e.g., from Nuance).

Replacing the entire navigation database during an update requires significant bandwidth and time. This may be especially problematic when updates are delivered over air via wireless networks. An update script and patch files may be used so that only changes are sent from the map developer to the navigation device. Utilizing update scripts and patch files can reduce the required bandwidth and time by delivering a patch file that is approximately 10-20% of the size of the new navigation database file.

Figure 2:
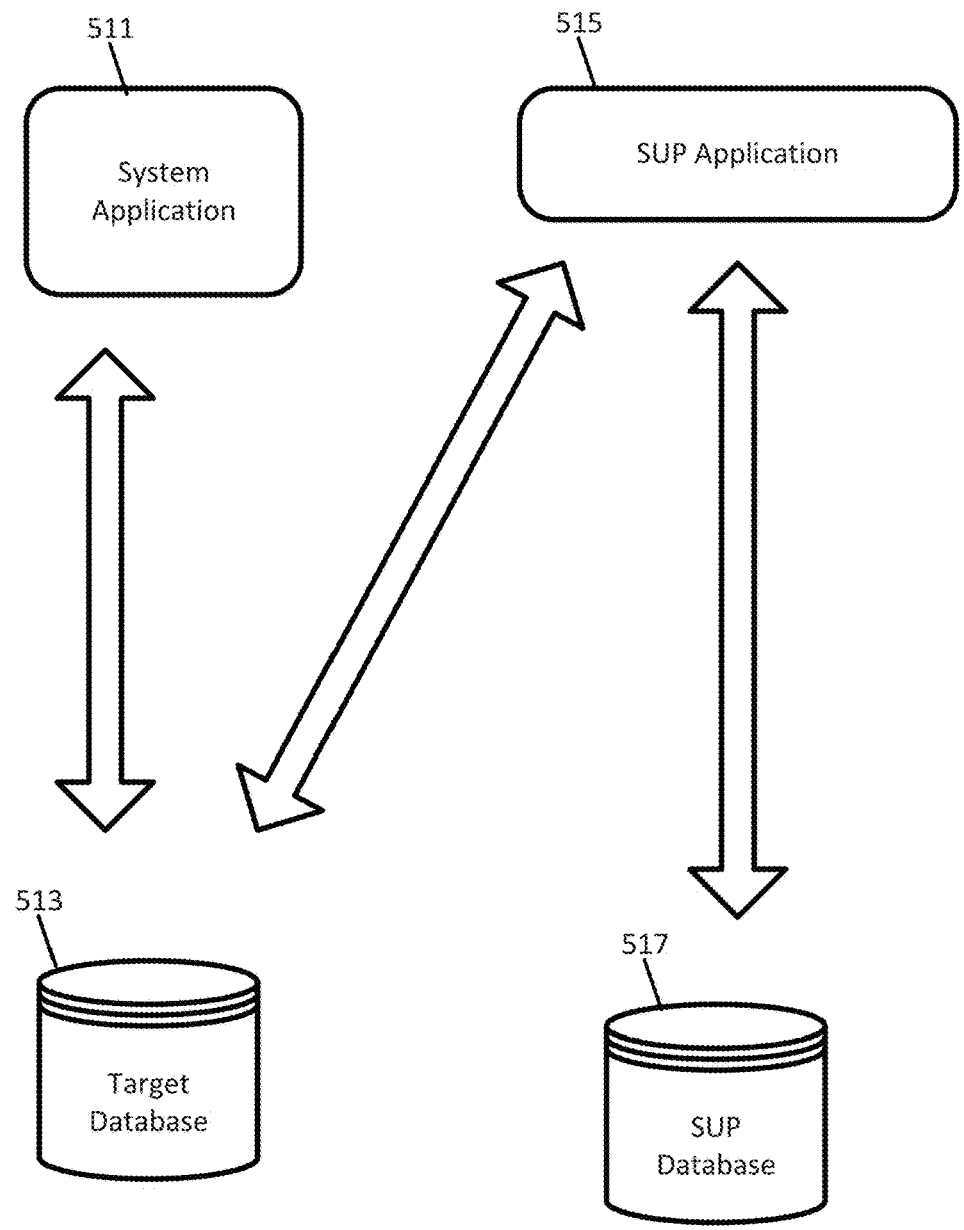
FIG. 2 illustrate a SQL update package (SUP) technique for updating navigational databases using intermediate databases.

FIG. 2 illustrates a SQL update package (SUP) technique for updating navigational databases using intermediate databases. The SUP technique applies relatively large updates to field databases or databases in use. During the update process, the SUP technique may be suspended and resumed based on user preference, timing, bandwidth, or access to a data connection.

A system application 511 includes software and/or hardware components configured to provide navigation related services. The system application 511 may be executed by a mobile device such as a smartphone, laptop, or tablet computer. The navigation related services may include routing (e.g., turn by turn or map illustrations) from an origin location to a destination or map exploration that allows a user to explore a map for place locations, roads, points of interest or other features.

An SUP application 515 may generate a target database 513 containing the updates or changes for the navigational database. An SUP application 515 may include an application programming interface (API) with write access to the target database 513.

In operation, the SUP application 515 examines the SUP database 517 in order to generate the target database 513. The SUP database 517 may include a table includes a text key and data values that correspond to update commands such as insert, update, and delete.

Figure 3:
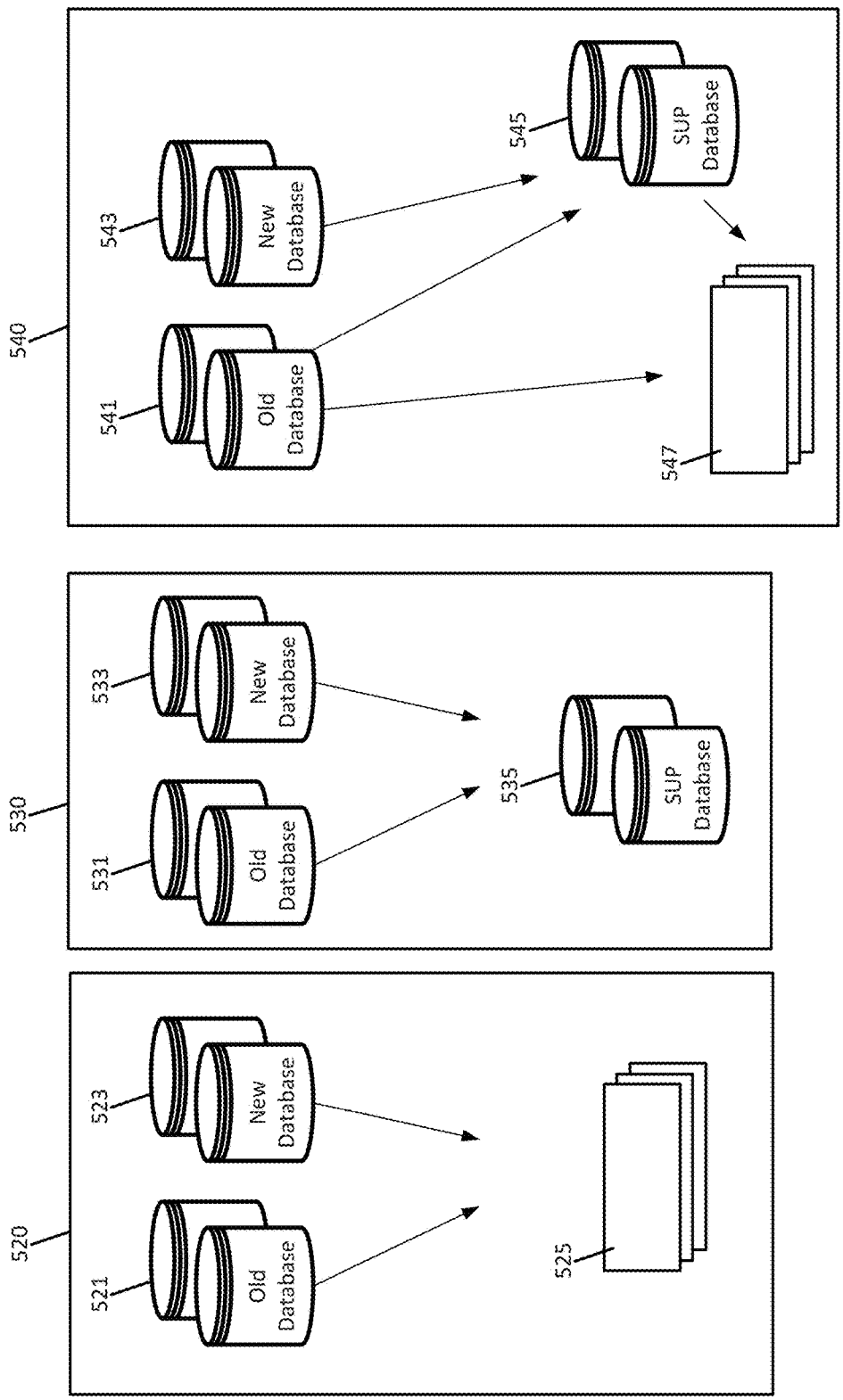
FIG. 3 illustrates example database update techniques.

FIG. 3 illustrates several database update techniques including a transformation approach 520, a data record approach 530, and a hybrid approach 540.

In the transformation approach 520, an old database 521 and new database 523 are compared to create an update package 525. The comparison of the transformation approach 520 may be based on any of the following difference operations described below.

A binary difference operation compares data on the byte level. A binary difference calculates the difference between two bit strings by comparing the first bit in one string to the first bit of the other string, and so forth. For example, when current navigation data is compared to new navigation data, the first byte of the current navigation data is compared to the first byte of the new navigation data, the second byte of the current navigation data is compared to the second byte of the new navigation data, and so on. The result of the binary difference operation may include the byte locations of the differences in the data and the edit operation for that location. Example edit operations include add data, delete data, or modify data.

Figure 4:
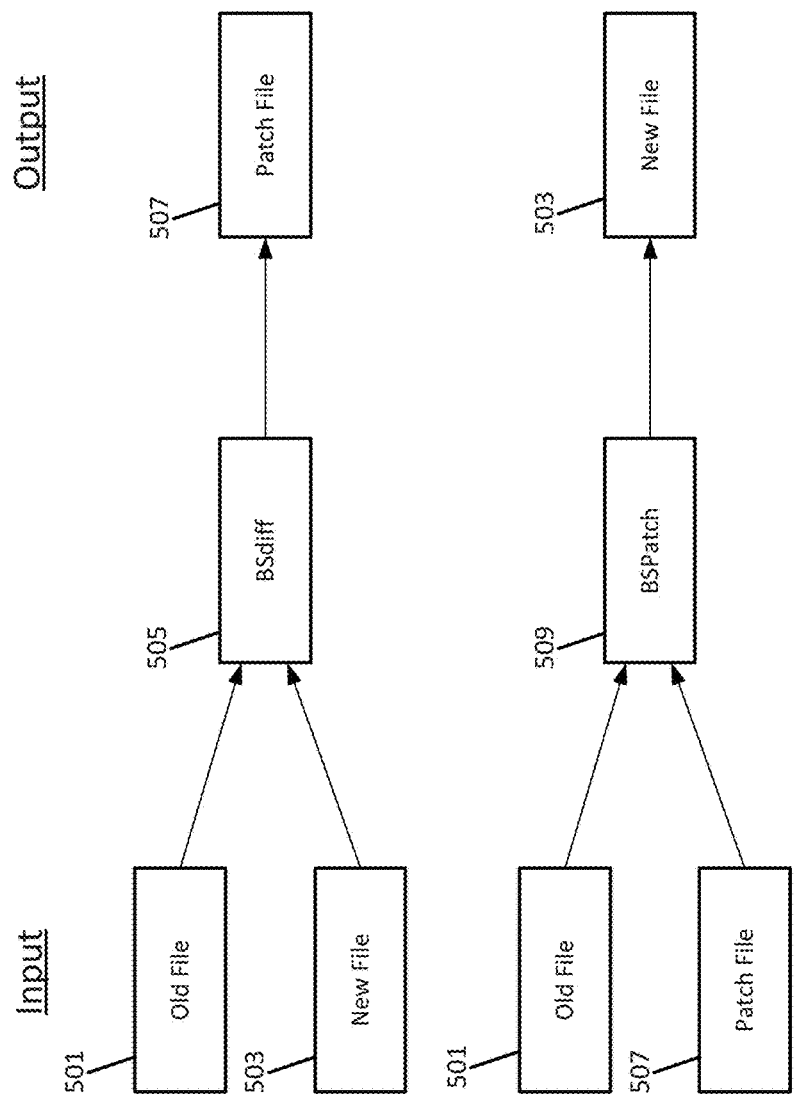
FIG. 4 illustrates example inputs and output of to a difference algorithm.

Another difference operation for identifying the changes in a new navigation database file is bytewise difference operations, for example a bytewise subtraction difference (BSdiff) operation. FIG. 4 illustrates example inputs and output of to a BSdiff algorithm. For example, BSdiff 505 may accept any two versions of a file (e.g., old file 501 and new file 503) and outputs a patch file (e.g., patch file 507). BSdiff can be applied to any type of file, and is not restricted to navigation files, NDS files or BLOBs. When updating an NDS database, the SQLite files and the speech recognition files must be updated concurrently. As the structure of the speech recognition files may be unknown, a standard BSdiff approach may be utilized to compute the update patch files for the speech recognition files. BSdiff operations may also be applied to the SQLite file concurrently. One or more patch files are typically created by a server performing the BSdiff operation, and the one or more patch file may be transmitted to navigation devices to run an update script (e.g., BSPatch).

A tree edit operation updates navigational data in a tree structure by specifying portions of the street structure that are deleted, replaced, or updated in an update script. A map tile may have a tree data structure including a root node assigned an identification value. One or more levels of intermediate nodes are connected to the root nodes and include object values. The tree structures may be modified by commands from an update script. The update script includes the modification, addition, or deletion of multiple nodes in the tree structure. The update script may include data for the addition of a branch of nodes or the replacement of a branch of nodes.

In the map data, the new data may be a change to a next valid character tree such as a new street name or a city name. The new data may be a new road or area into a basic map display tile. This type of update script for the difference between the old navigational data and the new navigational data may be an instruction to add a subtree into the tree structure. The inserted sub-tree represents the real world object. Other objects and data stored in the BLOB are not affected, but addresses and positions within the BLOB of other objects and data may be incremented or decremented according to the insertion or deletion. In one example, a real world change, such as the insertion of a new road link, might lead to several edit operations. For instance, the insertion of a new road link could lead to modification of the NDS LinkList structure, to additional insertion of entries into the NDS SimpleIntersectionList structure, and modification to other lists. The update script, or a series of update scripts in an update package, includes data related only to the sub-branch of nodes that are being changed. An update compiler incorporates the new or changed tree structures into the old tree stored in the BLOB.

A list update operation may be applied to BLOBs for a list of objects. The computing device may identify a list portion of BLOB for navigation data including road segments and road attributes. The list portion may include byte misaligned data, which is data that does not have a standard number of bits. The computing devices may analyze the BLOB in units (e.g., elements or lists) and compare each unit of the BLOB to a predetermined size. The predetermined size may be an integer number of bytes. When the units of the BLOB are not equal to an integer number of bytes or a modulus 8 of the number of bits is not equal to zero, the processor designates the first portion accordingly.

The computing device identifies a byte alignment in a second portion of the BLOB. The byte alignment occurs because the second portion of the BLOB does have an integer number of bytes or a modulus 8 of the number of bits is equal to zero. In other words, the number of bits is a multiple of 8, and the second portion of the BLOB can be expressed in bytes. Thus, a hexadecimal representation of an old version of the second portion of the BLOB and a hexadecimal representation of a new version of the second portion of the BLOB can be compared using a binary difference and the result is a manageable size. The size of the result of the binary different approximates that size of the updated data. The computing device may divide the first portion of the BLOB into multiple elements each having a predetermined size. The predetermined size may be based on the organization of the data. The predetermined size may be defined based on a list of attributes or other geographic data.

Within the map list operation, the computing device may perform a binary difference operation on the second portion of the BLOB and corresponding portion of an existing version of the geographic database. Because the second portion of the BLOB is byte aligned. The binary difference of the second portion may include the updates in the second portion. A series of operations for the first portion of the BLOB may include insert, delete, or update for the elements of the first portion of the BLOB.

In the data record approach 530, an old database 531 and new database 533 are compared to create an update package 525. The comparison of the data record approach identifies different records between the files in the old database 531 and new database 533. The resulting SUP database 535 includes a set of records which should be inserted, deleted, or updated in the old database 531. Consider a change a speed limit across a large area such as a region or country which includes a speed limit change for all highways in the large area. Every, or nearly all, data record in the database may be updated to adjust the speed limit. Using the difference approach, the update is small. The update may include the location of all fields with speed limits and the new values for those fields. However, in the data record approach, the SUP database includes all the data records that have been changed by modifying the speed limit. The SUP database in this example may be as large, or even larger, than the original database.

In the hybrid approach 540, the transformation approach 520 and the data record approach 530 are combined in part. The hybrid approach involves first comparing the data records to establish an SUP database then performing a difference operation using the records of the SUP database. The hybrid approach 540 generates an update that is smaller than that of either the transformation approach 520 or the data record approach 530 could achieve alone. The hybrid approach 540 is more efficient than the transformation approach 520 because no indexes are included. The hybrid approach 540 is more efficient than the data record approach 530 because less than the entire data records are included in the update.

Any of the approaching may be performed by a computer, a server, or a mobile device, which may be collectively referred to as a computing device. The computing device is a specialized computer for performing navigational database updates.

The computing device is configured to identify the old database 541 and the new database 543. The computing device reads the respective databases to determine old navigation records and an old index for the old database 541 and new navigation records and a new index for the new database 543. The indexes may include a numerical value for each data record. The indexes may be memory address locations.

The computing device is configured to perform a comparison between the old navigation data records and the navigation data records. The computing device may query the old database 541 for a particular record and the new database 543 for a corresponding record.

In response to the comparison, the computing device is configured to determine which of the corresponding data records are different between the old database 541 and the new database 543. The subset of data records that do not match are stored in memory at the computing device. The computing device may identify the subset in each of the databases such that a first subset of navigation data records are identified in the old database 541 and a corresponding second subset navigation data records are identified in the new database 543. The first subset and second subset correspond to records that have changed since the old database, which may correspond to SUP database 545. The computing device stores a copy of each of the navigation data records from the new database 543 and the corresponding navigation records from the old database 541 in memory. No index is stored with the copies of the navigation data records.

The computing device is configured to perform a difference operation on the first subset from the old database 541 and the second subset from the new database 543. The difference operation may be a binary difference, tree edit operation, or a list update operation. The computing device is configured to generate an update package 547 based on a result of the difference operation.

The update package is formed from the combination of a data record comparison and a subsequent difference operation. The SUP update package contains only information about changed table data, but not about changed indices. In other words, the update package does not involve any overhead related to patching indices. Such overhead may be bandwidth, memory, or other computing resources. Indices may be updated later by the client device (e.g., SQLite engine). Therefore, the indices may be omitted from the update package. Similarly, the update package may only contain data about the changed virtual tables and not about the underlying physical tables.

The index for the navigation data records is generated subsequent to generating the update package. A database utility (e.g., SQLite) may automatically generate the index, or multiple indexes, by applying the SUP database on the target system. The update operation in the SUP application 515 reads records from the SUP database 517 and issues an SQLupdate statement to the database system SQLite. The database system not only inserts, deletes or modifies the database record in the target database 513 but also adjusts the index structures stored in the target database 513.

The database utility may generate the index as the update package is applied or upon execution of the update package. The index may be generated in response to the update package being received at the client device.

Returning to the binary difference operations, a BSdiff patch file may be generated according to the following format. The first 32 bytes makeup the Header block. The first 8 bytes of the Header contain the text "BSDIFF40," followed by 8 bytes containing the Control block length. The next 8 bytes contain the Diff block length. Finally, the last 8 bytes of the Header contain the new file size. Next, the Control block contains one or more 24 byte rows, with each row representing a "ctrl0," "ctrl1" and "ctrl2," each 8 bytes long. Ctrl0 represents length of Diff block, indicating how many bytes will be read from Diff block. Ctrl1 represents length of Extra block, indicating how many bytes will be read from Extra block. Ctrl2 represents the seek offset for next row in the Control block. The total length of the Control block is contained in the Header. The control block is compressed by using bzip2. Next, the Diff block represents approximately matching bytes from the old and new files that were subtracted and concatenated. The total length of the Diff block is contained in the Header. This Diff block is also compressed by bzip2. Finally, the Extra block represents non-matching contents from the new file. The total length of the Extra block is not contained in the patch file, as the Extra block spans the remainder of the patch file. Bzip2 is also used to compress the Extra block, but the compression may not succeed to reduce overall size as it succeeds for the Control block and the Diff block.

By way of example, a patch file may be generated according to the following BSdiff algorithm. First, the location of the old file and the new file, as well as the target location of the patch file received as inputs. Second, the entire old file is read into memory buffer. Third, a suffix tree is generated for the entire old file. Fourth, the new file is read byte by byte to identify the best match within the entirety of the old file. Step four takes advantage of the suffix tree created in step three. Fifth, approximately matching byte differences are identified and stored in the Diff block. Newly added bytes are also identified and appended in the Extra block. A Control block row (ctrl0, ctrl1 and ctrl2) may be appended to the Control block such that: ctrl0 will represent the length of uncompressed Diff block with approximately matching bytes; ctrl1 will represent the length of the uncompressed Extra block with newly added bytes from the new file; and ctrl2 will represent the seek offset providing the seek location of the next best matching block from the old file. Sixth, the Control block, Diff block and Extra block are compressed using bzip2. Seventh, steps four through six are repeated until the new file has been processed completely. Eighth, the Header is updated with the correct values of the Control block size, Diff block size and new file size to complete the patch file.

FIG. 4 further illustrates example inputs and output of a BSPatch algorithm. For example, BSPatch 509 may receive a patch file (e.g., patch file 507) and uses the old file used to generate the patch file (e.g., old file 501) to generate the new file used to generate the patch file (e.g., new file 503). The patch file(s) are typically used by navigation devices performing the BSPatch operation, allowing the navigation device to update its navigation database.

As described above, a standard BSdiff operation attempts to find the best match for sections of the new file within the entirety of the old file. BSdiff algorithms attempt to find patterns in the old file that can be used for generating the new file. Thus, the BSPatch operation refers to positions in the old file where the matching patterns were located by the BSdiff operation. Because the BSdiff algorithm seeks to find the best match within the entire old file, the patch file may contain large seek offset values (i.e., ctrl2) for each row in the Control block.

Figure 5:
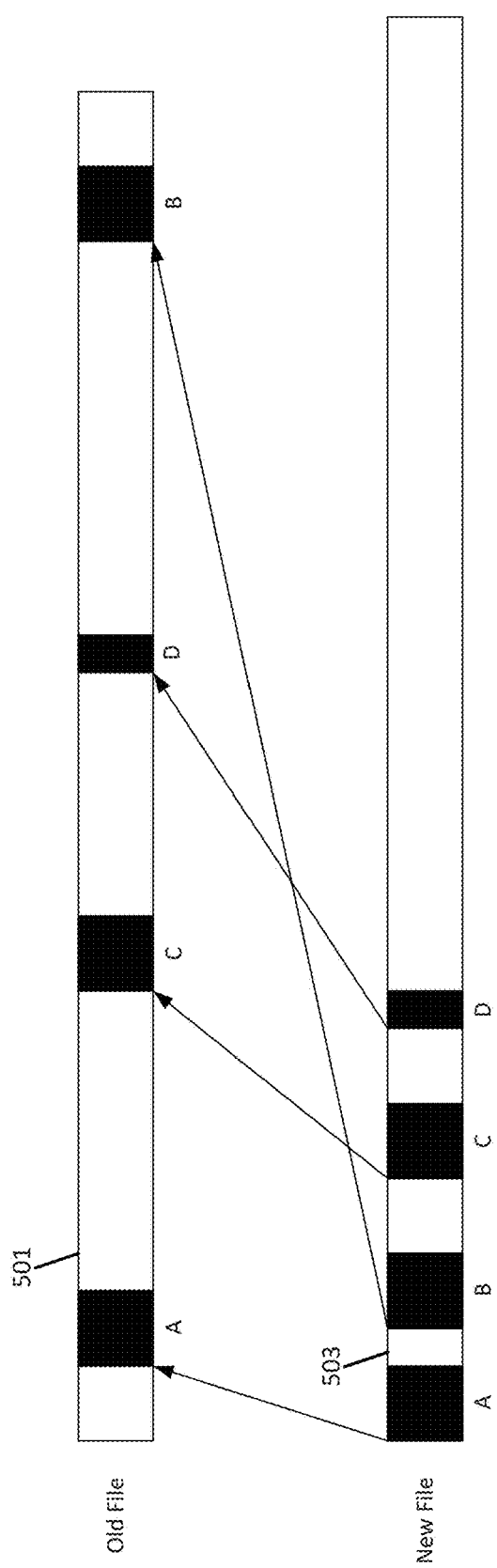
FIG. 5 illustrates data locations in an example database.

FIG. 5 illustrates an example of how a BSdiff algorithm may identify the best matching patterns for the new file within the old file. For the purposes of this example, data blocks from the new file 503 are labeled with the same letter corresponding data blocks from the old file 501. When reading data block A from the old file, BSPatch must seek from its current position in the old file (e.g., beginning at index 0) to the start of data block A. In this case, the seek offset will be a positive number and BSPatch will perform a read operation from data block A. Next, BSPatch will read from data block B. The seek offset from the end of data block A (e.g., a numerically low index value) to the beginning of data block B (e.g., a numerically high index value) will require a large seek offset, in the positive direction. BSPatch will continue seek and read operations until each corresponding data block has been read. The seek offset value from the end of data block B to the beginning of data block C is a large, negative value. Finally, the seek offset value from the end of data block C to the beginning of data block D will be a large, positive number, and so on for the remaining data blocks.

Large seek offset values between rows in the Control block result from matching and reading data from the old file in a scattered manner. Therefore, the BSPatch operation must also read data from the old file in the same, scattered manner.

For small file sizes, BSdiff and BSPatch may be an efficient way to provide database updates. For example, when file sizes are small, the entire old file may be loaded into buffer by the target system, and each read and seek operation merely corresponds to an efficient array access. However, as file sizes increase, reading data from the old file in a scattered manner may be inefficient because the target system may not be able to load the entire old file into buffer. For example, some navigation files are very large, up to and exceeding 1 gigabyte in size, and the target systems, such as mobile devices and automotive head units, have a very limited amount of main memory. In this example, the old file cannot be kept in main memory. When the old file cannot be entirely loaded into memory, a physical I/O operation (e.g., fseek/fread) may be required for each Control block entry of the patch file. The physical I/O operations may be time consuming and lead to BSPatch algorithm times of up to and exceeding 50 hours for a navigation database update.

The following examples of a BSdiff approach which may reduce I/O operations considerably and speed up BSPatch on embedded systems by a factor of up to and exceeding 100. The new BSdiff approach takes advantage of the fact that new navigational databases are typically created in the same sequential order, resulting in files that are very similar to each other. Utilizing this similarity between files, the new BSdiff approach may generate an incremental update patch for a navigational database by only comparing new file data blocks with old file data blocks in related locations, resulting in less seek time.

For example, the old file may be divided into equally sized data blocks. The new file may also be divided into equally sized data blocks, preferably smaller in size. Overlapping data blocks may also be introduced for the old file, preferably twice, or approximately twice, the size of the data blocks in the new file. BSdiff operations may be performed between related data blocks from the two files, including the overlapping data blocks from the old file, to generate patch files for each data block in the new file. The resulting patch files are merged to generate a final patch file. The final patch size may be larger in size than a patch file generated by a standard BSdiff algorithm, however, the final patch file generated using the new BSdiff approach may greatly reduce the time required to perform the BSPatch algorithm on the target device.

For example, a target device may have only 32 megabytes of random-access memory (RAM). Using a standard BSdiff patch file, the BSPatch algorithm may take 50 hours or more to execute, with approximately 75% of that time spent on seek and read functions. For example, the 32 megabyte target device may take nearly 8 milliseconds to seek and read a data block from old file while applying the patch. Therefore, the BSPatch algorithm must seek and read 6826 times per 1 megabyte of the new file. Thus, for each megabyte, the BSPatch will take 54,608 milliseconds (i.e., 6826 freads multiplied by 8 milliseconds). However, using the new BSdiff approach, for example, the BSPatch algorithm must only seek and read a maximum of 2 times per 1 megabyte of the new file. Thus, seek and read functions may be reduced by 99%, allowing the BSPatch execute much faster. For example, the time necessary to apply a patch may be reduced from approximately 50 hours to approximately 50 minutes. To calculate the total number of seek and read functions required for the new BSdiff approach, the following equation may be used: freads=((new file size in megabytes)*2)/(8 megabytes). The old file normal block size is 8 megabytes. For example, an 80 megabyte new file may require 20 seek and read functions (freads).

Figure 6:
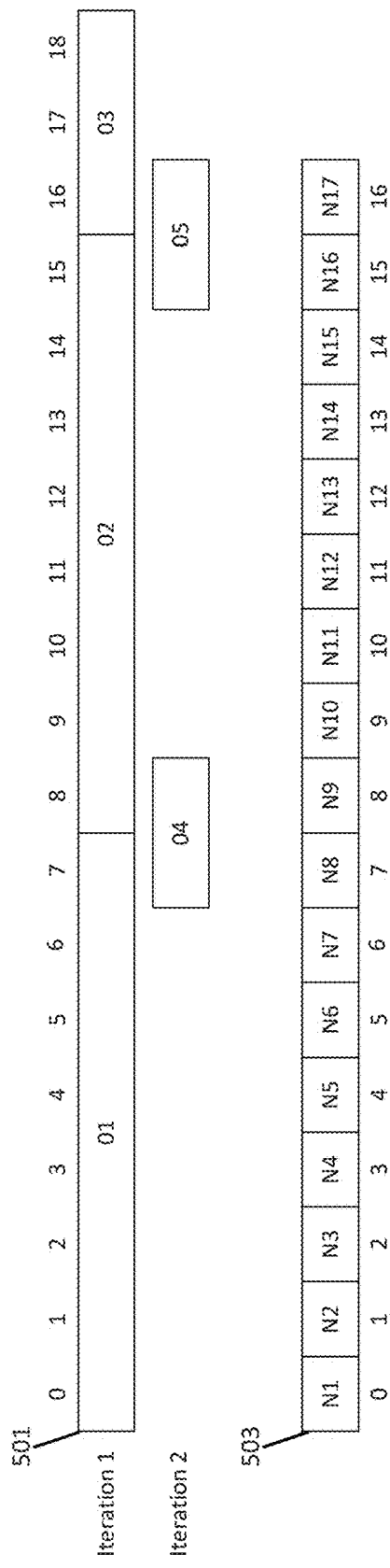
FIG. 6 illustrates an example of data blocks for a difference algorithm.

FIG. 6 illustrates an example of data blocks used for a BSdiff operation according to an embodiment of the disclosed invention. In one example, the old file 501 is 19 megabytes and the new file 503 is 17 megabytes. The BSdiff operation may be performed in two iterations. In the first iteration, the BSdiff operation may be performed with the old file data blocks. In the second iteration, the BSdiff operation may be performed with the overlapping data blocks. For iteration 1, the old file may be divided into data blocks represented by 01, 02 and 03. The old file data blocks may be equally sized with a predetermined length (e.g., 8 megabytes). For iteration 2, the overlapping data blocks are introduced and may be represented by 04 and 05. Each overlapping data block may be equally sized with a predetermined length (e.g., 2 megabytes). In one example, the overlapping data blocks may be twice the size of the new data blocks. In another example, the overlapping data blocks may the same predetermined length as the new file data blocks (e.g., 8 megabytes). The overlapping data block size may be modifiable. Typically, the overlapping data blocks are smaller than the old data blocks and larger than the new file data blocks. In another example, unequally sized overlapping data blocks may be introduced. For example, the last overlapping data block may be a larger or smaller than other overlapping data blocks. The overlapping data blocks may be introduced at the boundaries of the old data blocks, typically lying equally across two old data blocks. In one example, an overlapping data block may be lie unequally across two old data blocks. For example, the last overlapping data block may lie farther over the preceding old data block than the last old data block (e.g., if the last old data block is smaller than the preceding old data block). The new file may be divided into data blocks represented by N1 to N17. The new file data blocks may be equally sized with a predetermined length (e.g., 1 megabyte).

Figure 7:
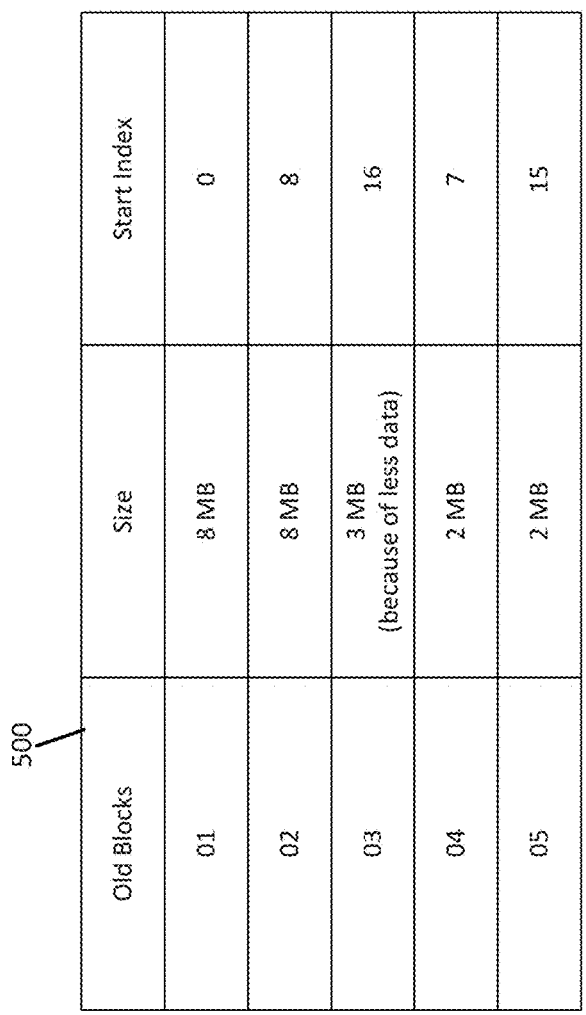
FIG. 7 illustrates data block sizes and data block starting indexes.

FIG. 7 illustrates data block sizes and data block starting indexes for the example in FIG. 6. Table 500 shows that data blocks 01, 02 and 03 may be a predetermined size (e.g., 8, 8 and 3 megabytes long, respectively). Data block 03 may be only 3 megabytes long because only 3 megabytes remain in the old file when the old file is divided by the predetermined size (e.g., 8 megabytes). Data blocks 04 and 05 are both a predetermined size (e.g., 2 megabytes long). The start index of data blocks 01, 02, 03, 04 and 05 are 0, 8, 16, 7 and 15, respectfully. In one example, the old data blocks, the new data blocks and the overlapping old data blocks may be identified and stored in one or more tables storing references to the size and starting index of the data blocks (e.g., table 500). Alternatively, the old data blocks, the new data blocks and the overlapping old data blocks may be stored as separate files from the old file and new file. The size of the old data blocks, the new data blocks and the overlapping old data blocks may be determined by default settings, by file type, and/or by user input.

Each old data block may be compared with corresponding new data blocks (e.g., 8 new data blocks) and each overlapping data block may be compared with corresponding new data blocks (e.g., 2 new data blocks). In the interest of finding more matches, a left focus technique and a right focus technique may be introduced. A left and right focus may identify more matching data blocks in the old file. A left focus represents how many new data blocks immediately preceding the related new data blocks that will be compared with the old data block. A right focus represents how many new data blocks immediately following the corresponding new data blocks that will be compared with the old data block. The higher the right and left focus, the longer the BSdiff algorithm will take to generate the patch files.

Figure 8:
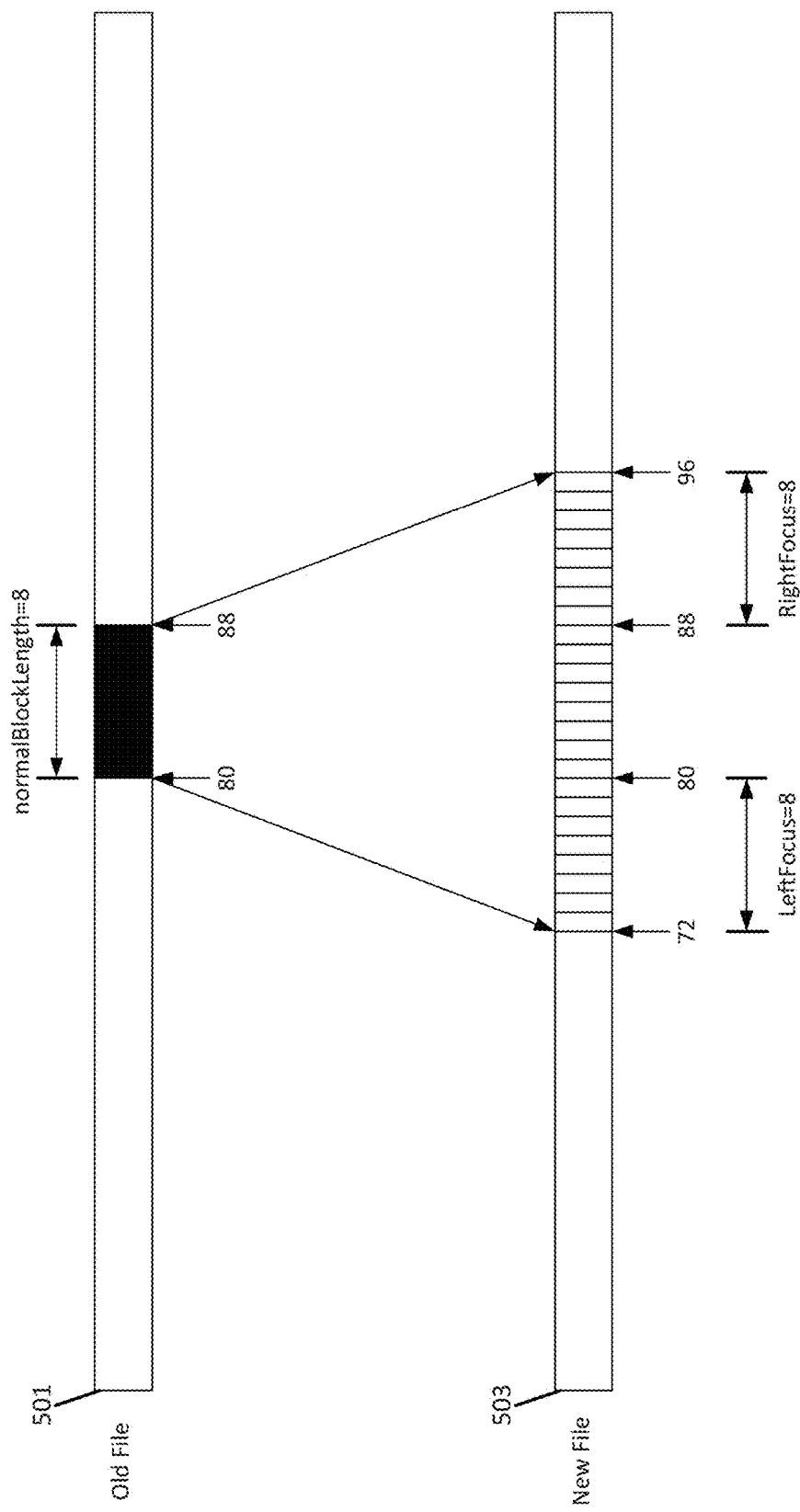
FIG. 8 illustrates an example of a right focus and left focus.

FIG. 8 illustrates an example of a right focus and left focus according to an embodiment. In this example, an 8 megabyte (i.e., normalBlockLenth=8) old file data block from old file 501 begins at index 80 is compared to the corresponding new file data blocks at the same location in the new file 503, at indexes 80 to 87. The old file data block is also compared to the left and right focus. In this example, the left focus is 8 megabytes long (i.e., LeftFocus=8) and the right focus is 8 megabytes long (i.e., RightFocus=8). The left focus begins at index 72 and the right focus begins at index 88, immediately preceding and following the new file data blocks at the same location as the old data block.

In the example provided in FIG. 8, each old data block may be compared with 24 new data blocks: the 8 new data blocks in the same index location as the old data block; 8 new data blocks immediately preceding the index location of the old data block; and 8 new data blocks immediately following the index location of the old data block. These comparison operations may result in 24 separate patch files for the new file blocks. Similarly, each overlapping old data block may be compared to 18 new data blocks: the 2 new data blocks in the same index location as the overlapping old data block; 8 new data blocks immediately preceding the index location of the overlapping old data block; and 8 new data blocks immediately following the index location of the overlapping old data block. These comparison operations may result in 18 separate patch files for the new data blocks. The following formula may be used to determine how many patch will be generated for the new data blocks when a right and left offset is used: Number of Patch Files=(normalBlockLength+RightFocus+LeftFocus)/newBlockLength. Where: normalBlockLength=old data block size; RightFocus=right focus size; LeftFocus=left focus size; and newBlockLength=new data block size. For this example, the normalBlockLength, RightFocus and LeftFocus may be a multiple of the newBlockLength. The resulting patch files may be in the same format as standard BSdiff patch files. Standard BSdiff patch files are discussed above. The process will typically span the entire old file.

The last old data block may be compared with more or fewer new data blocks, depending on the size of the new and old files. For example, for last old data block and for last overlapping old data block, the operations may ensure that a comparison is made to the entire new file. For example, if the old file size is 12 megabytes and new file size is 24 megabytes, the BSdiff operations may ensure that the last old data block and the last overlapping old data block are compared through the end of the new file. In this example, the operations may ensure that the comparison does not end at new file index 20, but instead continues through index 24. In some cases, when the old and new file size are dissimilar in length, transmitting the entire new file may be advantageous over an incremental update using a patch file.

The comparison operations as discussed above may compare a new data block with more than one old data block, resulting in more than one patch file for each new data block. In this case, the respective patch file sizes for each new data block are compared and the patch file with the smallest patch file may be selected and stored (i.e., temp_XXX.path, where XXX represents the new file data block number). The smallest patch file sizes may also be stored in an arrays for later use. Typically, the smallest patch file provides the best match for the new data block from the corresponding old data blocks. In one example, every patch file for each new data block may be stored, and the smallest patch file for each may be selected from the various patch files after the new file has be processed completely. In another example, only one patch file is stored for each new data block, and the currently stored patch file for a new data block may be replaced and overwritten by a smaller patch file when the smaller patch file is generated. By overwriting the currently stored patch files with smaller patch files, the smallest patch file may remain stored for each new file data block when the comparison operations are complete.

FIG. 9 illustrates an example data block array for a 17 megabyte new file. For example, in table 502, three arrays may be stored, each with 17 entries corresponding to the 17 new file data blocks, when each new data block is 1 megabyte long. The first array may hold the patch size for the best matching patch file for each new data block. The patch size is the byte size of the best matching patch file. A smaller patch file corresponds results from a greater amount of data concatenated directly from the old file (i.e. using the Diff block), where a larger patch file corresponds to more new data that may not be concatenated from the old file (i.e., using the Extra block). The second array may hold the best matching old data block number for the best matching patch file for each new data block. The third array may hold the best matching old block size for the best matching patch file for each new data block.

The patch files generated for the new data file blocks may be merged or combined to generate a final or merged patch file for the new file which may be utilized by a navigation device (i.e., using BSPatch). For example, the arrays and patch files, as discussed above, may be used to generate the merged patch file. Preferably, the smallest patch file for each new file data block is selected. The merging operations may utilize the respective Control blocks, Diff blocks and Extra blocks from each patch file to generate an appropriate Header, Control block, Diff block and Extra block for the final patch file. The merging operations may merge the respective Control blocks, Diff blocks and Extra blocks separately, and later merge each into the final patch file.

The Control blocks from the respective patch files may be directly concatenated. No changes to the Control blocks are necessary, except for the last Control block of each respective patch file. The last control block of each patch file may be updated to provide the seek offset value for the best matching old data block starting index of the next patch file to be merged. For example, for the last Control block of a patch tile, the seek offset value in BSpatch (i.e., OldPos) may be set to the best matching old file data block for the next new data block patch file. An additional Control block row (i.e., ctrl0=0; ctrl1=0; ctrl2=offset) may also be added to the beginning of the Control block, where the seek offset (i.e., ctrl2) may be set to the best matching old data block of the first new data block.

The Diff blocks and Extra blocks from the respective patch files may also be directly concatenated. No changes to the Diff or Extra blocks are necessary. The Header information in the final patch file may be updated to reflect the final Control block size, Diff block size and new file size. After the merging operations are complete, the respective patch files are no longer needed and may be deleted to free up memory. The final or merged patch file may be in the same format as standard BSdiff patch files, allowing the final patch file to be utilized by existing BSPatch algorithms. Standard BSdiff patch files and BSPatch algorithms are discussed above. Because the respective patch files resulted from comparisons to related locations in old file, only portions of the old file must be loaded into the device buffer. Hence, the memory requirement of BSPatch may be reduced to below a target level (e.g., 10 MB).

Figure 10:
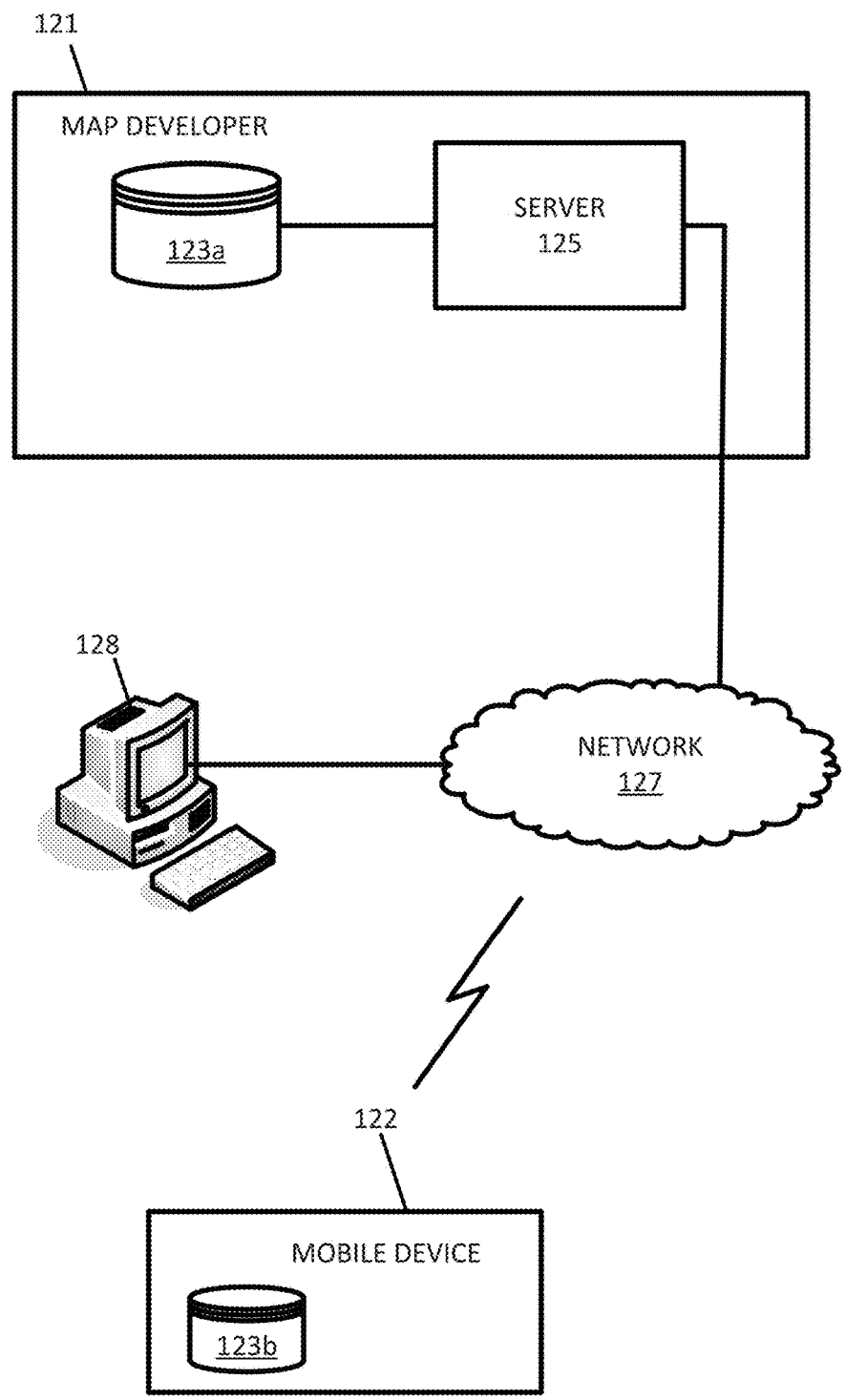
FIG. 10 illustrates an example map developer system that may be used for updating navigation databases.

FIG. 10 illustrates an example map developer system 120 that may be used for updating navigation databases. The system 120 may include a developer system 121, one or more mobile devices 122 (e.g., navigation devices), a workstation 128, and a network 127. The developer system 121 includes a server 125 and one or more databases. The database 123*a-b* may be a geographic database including road links or segments. Additional, different, or fewer components may be provided. For example, many mobile devices 122 and/or workstations 128 may connect with the network 127.

As shown in FIG. 4, a master copy of the database 123*a* may be stored at the developer system 121, and a local copy of the database 123*b* may be stored at the mobile device 122. In one example, the local copy of the database 123*b* is a full copy of the geographic database, and in another example, the local copy of the database 123*b* may be a cached or partial portion of the geographic database. The cached portion may be defined based on a geographic location of the mobile device 122 or a user selection made at the mobile device 122.

The databases 123*a-b* may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities.

Each road segment may be associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segments may include sidewalks and crosswalks for travel by pedestrians.

Each of the road segments or links may be associated with various attributes or features stored in lists that are not byte aligned. The road segment data record may include data that indicate a speed limit or speed category (i.e., the maximum permitted vehicular speed of travel) on the represented road segment. The road segment data record may also include data that indicate a classification such as a rank of a road segment that may correspond to its functional class. The road segment data may include a segment ID by which the data record can be identified in the geographic database 123. The road segment data, nodes, segment IDs, attributes, fields, and other data may be organized in data structures described above.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. The additional road segment data may be organized in data tree structures. Alternatively, the data tree structures may be included in a separate database, for example, internal to the server 125 and/or the mobile device 122, or at an external location.

The server 125 may send map updates to the mobile device 122. The server 125 may update a particular tile of the geographic database 123. The server 125 may send updates to the master copy of the database 123a and/or send updates to the local copy of the database 123b. The server 125 may generate an update script or patch file for the navigation data and transmit the update script or patch file to the mobile device 122 to update the local copy of the database 123b.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The mobile device 122 may be configured to execute routing algorithms to determine an optimum route to travel along a road network from an origin location to a destination location in a geographic region. Using input from the end user, the mobile device 122 examines potential routes between the origin location and the destination location to determine the optimum route. The mobile device 122 may then provide the end user with information about the optimum route in the form of guidance that identifies the maneuvers required to be taken by the end user to travel from the origin to the destination location. Some mobile devices show detailed maps on displays outlining the route, the types of maneuvers to be taken at various locations along the route, locations of certain types of features, and so on.

The mobile device 122 may also be configured to execute an update script or navigation patch file using locally stored map data. The mobile device 122 may receive the update script and/or navigation patch file from the server 125 by way of network 127. The update script or patch file may include less data than a wholesale replacement the database, a portion of the database or a BLOB, and requires less bandwidth and/or transmission time than the wholesale replacement. The update script and/or patch file may be stored in a computer readable medium coupled to the server 125 or the mobile device 122, which may be referred to as a navigation device.

Figure 11:
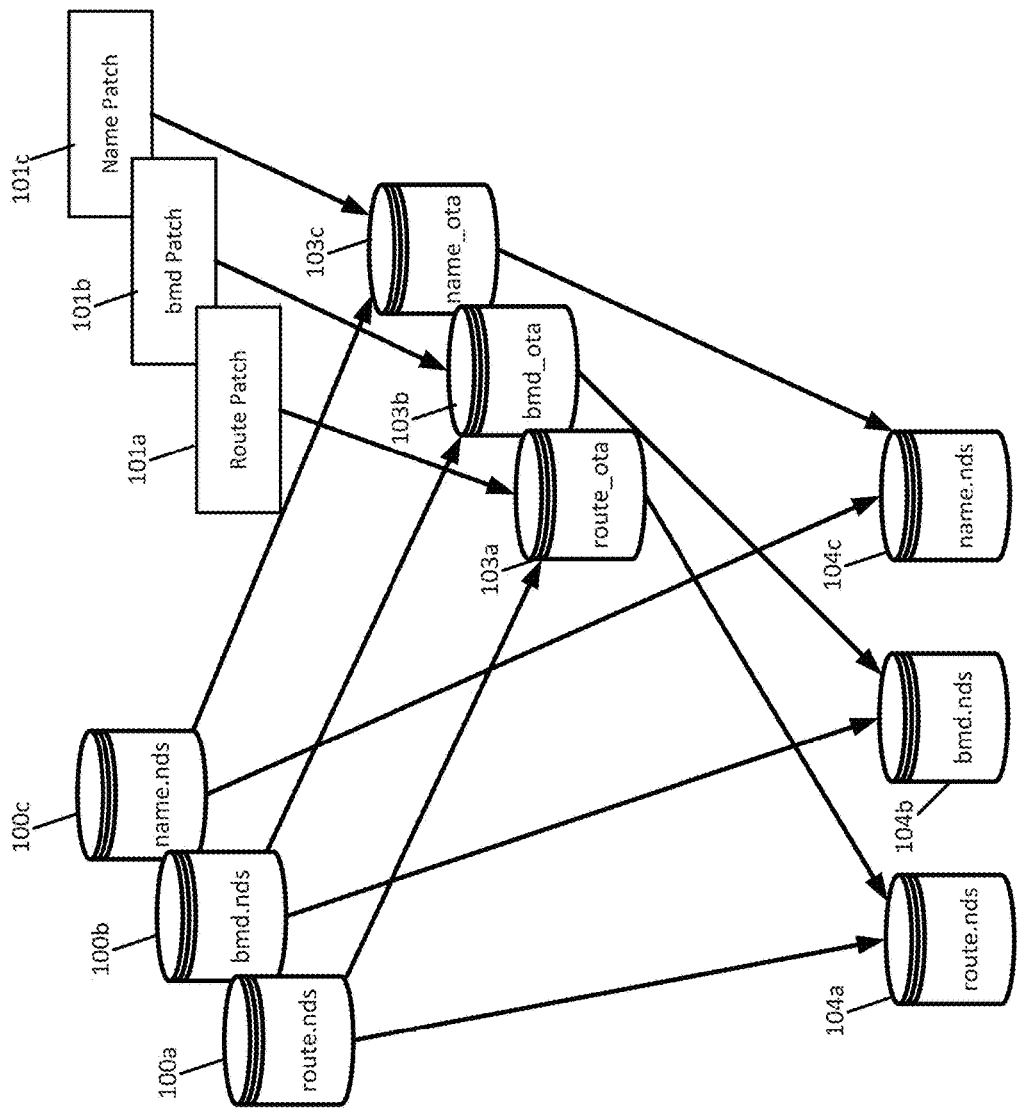
FIG. 11 illustrates a sequence for applying the update sequence to a navigation database.

FIG. 11 illustrates a sequence for applying the update sequence to a navigation database. The sequence may be applied by the mobile device 122. The mobile device 122 initially stores the old databases 100a-c and receives the update package including patches 101a-c.

The navigation database may be divided into multiple components or multiple databases. In one example, the navigation database is divided into route data records or database 100a, BMD records or database 100b, and name records or database 100c. The route records may include road segments. The BMD records may describe the sizes, orientations, colors and other display characteristics for the map data. The name records may include the place names and POI names for places in the map data. The update packages includes corresponding patches for the divisions of data records or databases, including a route patch file 101a, a BMD patch file 101b, and a place name patch file 101c.

The mobile device 122 creates the SUP databases 103a-c, which may be intermediate databases, by reading the old databases 100a-c and the patch files 101a-c. In one example, when the bsdiff algorithm was used to create the patch files 101a-c, the mobile device 122 runs the bspatch algorithm to generate the intermediate databases.

Subsequently, the mobile device 122 generates the new navigation files or new databases 104a-c by combining the intermediate databases and the old databases 100a-c. For example, the old route database 100a may include road segment data records 1, 2, 3, and 4, and the intermediate database for route 103a may include road segment data record 3'. The mobile device 122 is configured to replace road segment 3 from the old route database with the new road segment data records 3'.

In one example the divisions of the navigation databases are updated in parallel. For example, the route patch file 101a, the BMD patch file 101b, and the place name patch file 101c may be applied at the same or nearly the same time. In another example, the route patch files 101a-c are applied in serial. The order of the patches may be configured by the user. Alternatively, an order of the patches may be automatically selected based on a predetermined schedule. In one example, the mobile device 122 may determine a size of available memory, an availability of a network connection, a speed of the network connection, or an amount of available bandwidth. The mobile device may select the order based on any combination of the size of available memory, the availability of a network connection, the speed of the network connection, or the amount of available bandwidth.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the mobile device 122. In some embodiments, the server 125 performs a majority of the processing for generating the final navigational patch file. In other embodiments, the mobile device 122 or the workstation 128 performs a majority of the processing. In addition, the processing may be divided substantially evenly between the server 125 and the mobile device 122 or workstation 128.

Figure 12:
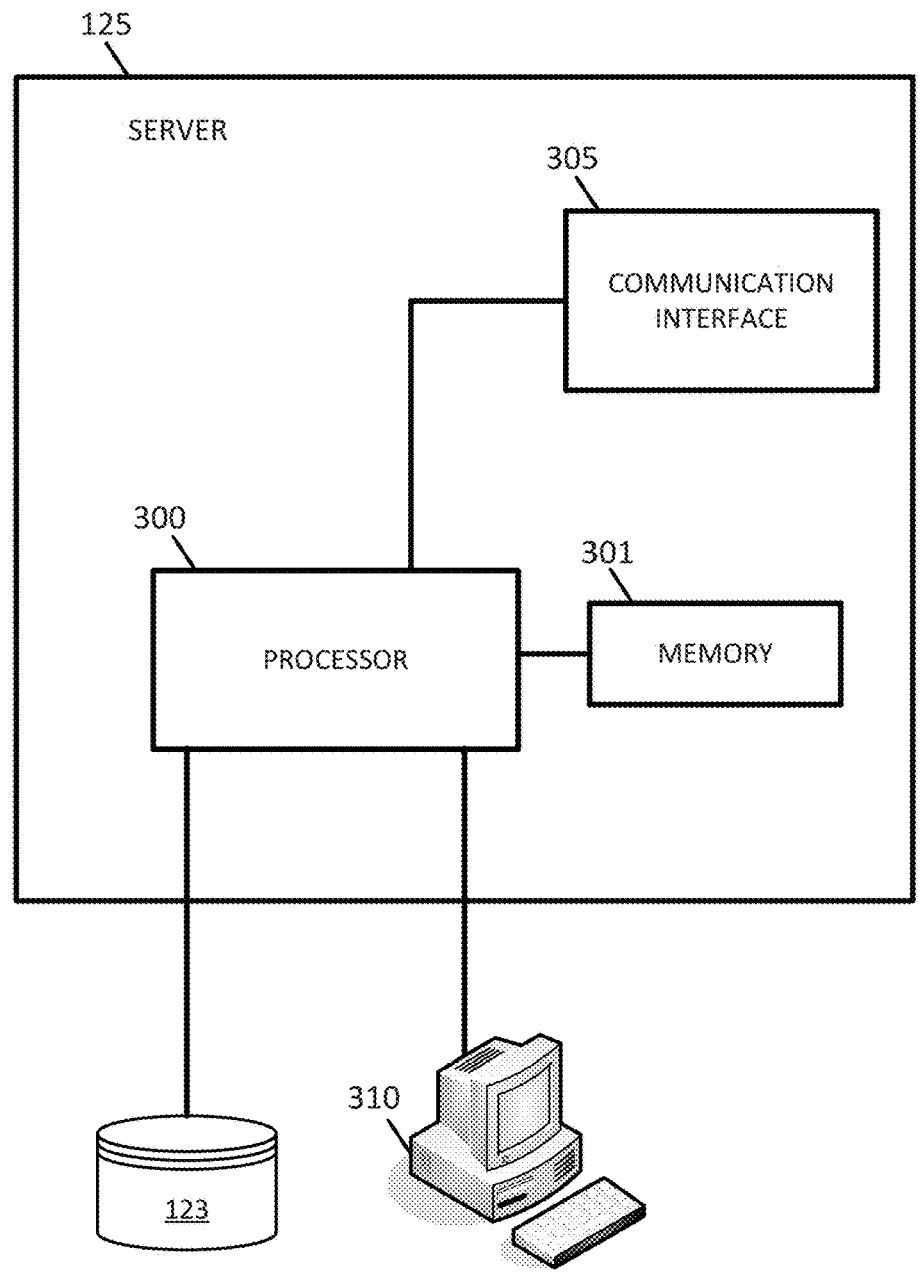
FIG. 12 illustrates an example server of the map developer system according to an embodiment of the disclosed invention.

FIG. 12 illustrates an example server 125. The server 125 includes a processor 300, a communication interface 305, and a memory 301. The server 125 may be coupled to a database 123 and a workstation 310. The workstation 310 may be used to enter data regarding the type of update script that will be used (e.g., standard BSdiff versus BSdiff using related data blocks). The database 123 may be a geographic database as discussed above. Additional, different, or fewer components may be provided in the server 125.

Figure 13:
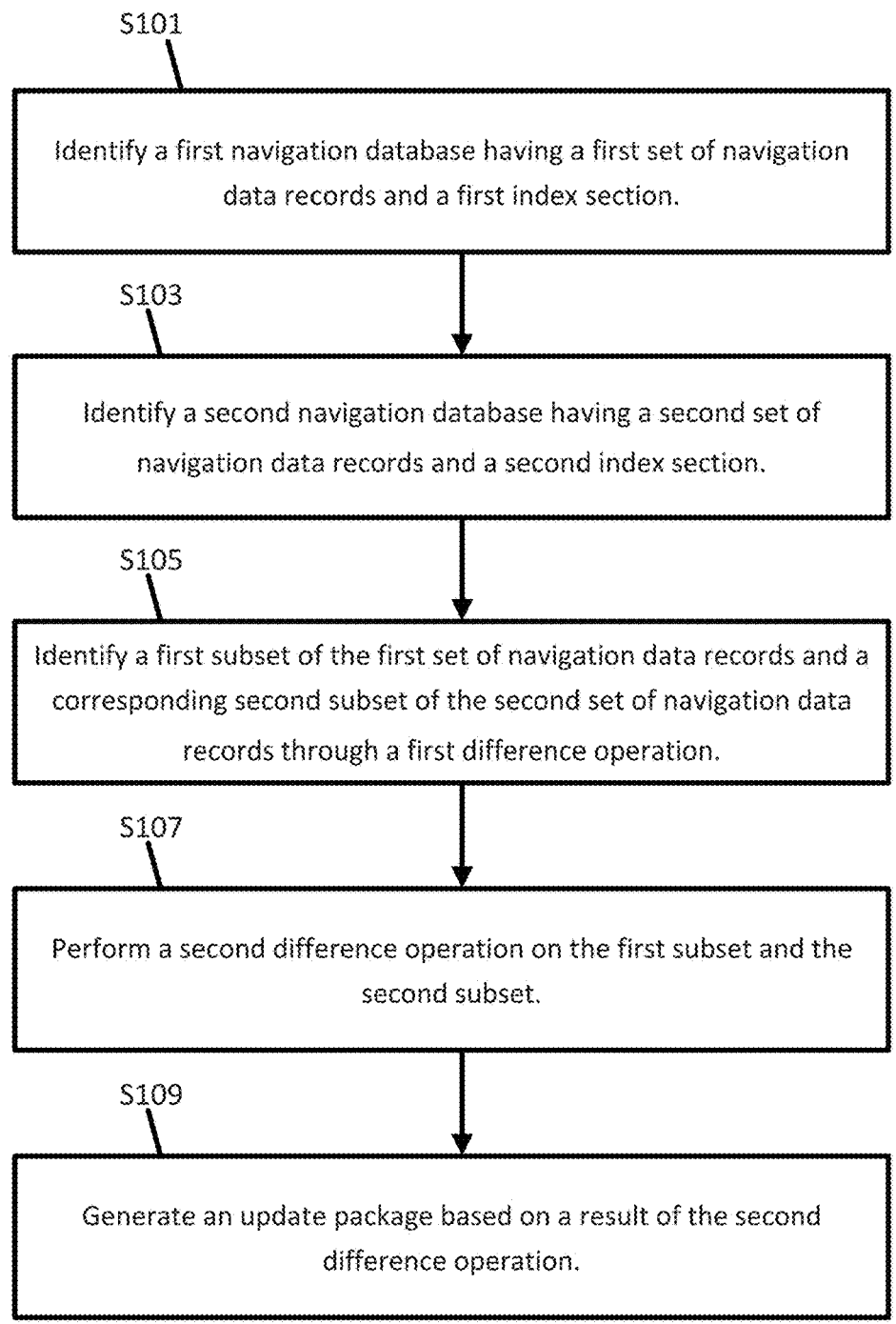
FIG. 13 illustrates an example flowchart for the server device of FIG. 12 according to an embodiment of the disclosed invention.

FIG. 13 illustrates an example flowchart for the operation of server 125 according to an embodiment. Additional, different, or fewer acts may be provided. Some acts may be repeated.

In act S101, the processor 300 identifies a first navigation database having a first set of navigation data records and a first index section. In act S103, the processor 300 identifies a second navigation database having a second set of navigation data records and a second index section. The navigation data records may include any combination of road segment data, road attribute data, map display features, and place names. The index section may include identifier for the navigation data records. The first and second navigation databases may use the same index schema or different index schema.

In act S105, the processor 300 compares the first and second navigation database in order to identify a subset navigation records that corresponds to a portion of the first set of navigation data records and a corresponding portion of the second set of navigation data records. The comparison may be a first difference operation. The comparison may be a SQL operation. The subset includes all of the records that have changed between the first and second navigation databases.

In act S107, the processor 300 performs a second difference operation on the first subset and the second subset. The difference operation may be a binary difference operation, a map list difference operation, or a tree edit operation, as described above. The result of the difference operation includes the differences in data within the subset of records from S105 that has changes between the first and second navigation databases.

In act S109, the processor 300 generates an update package based on a result of the second difference operation. The update package includes instructions to apply the result of the difference operation to the old database. The update package does not include an index. In effect, the update package is generated by applying multiple difference operations. For example, the update package is generated by applying another difference operation between the first navigation database and the result of the difference operation from act S107.

Figure 14:
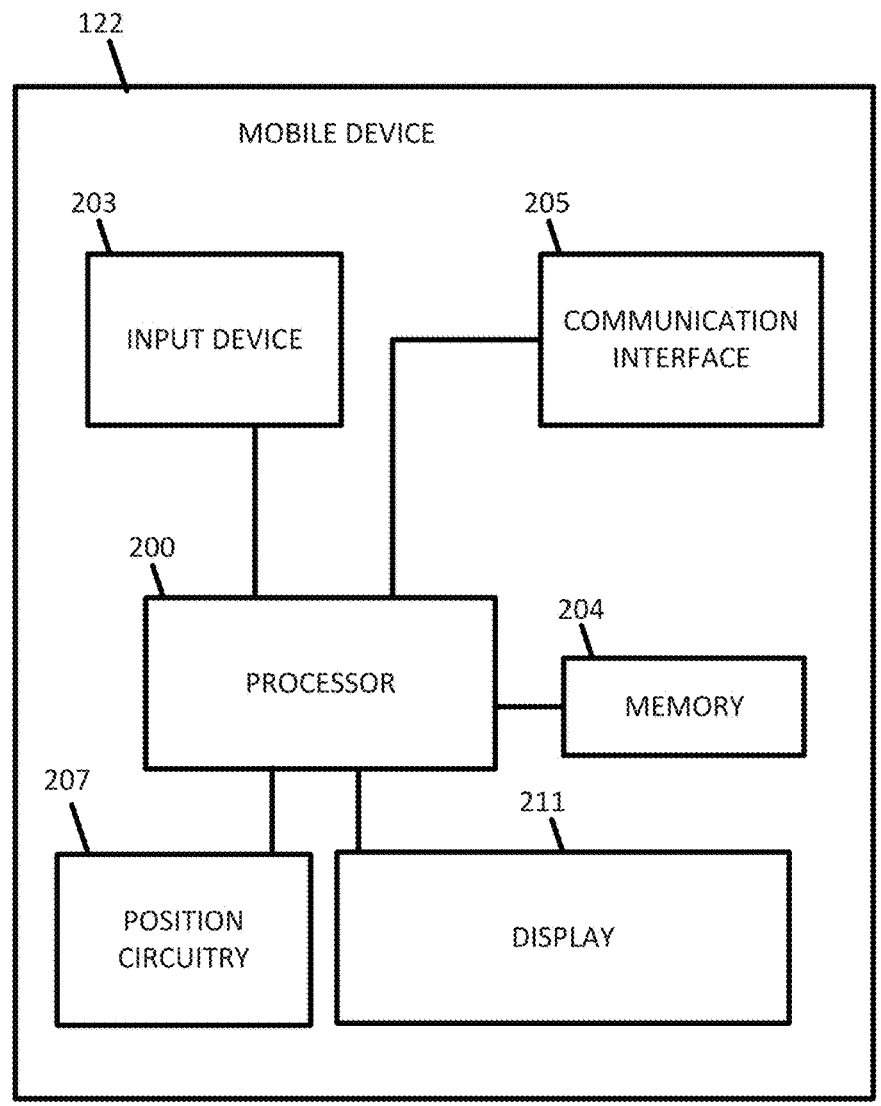
FIG. 14 illustrates an example mobile device in communication with the map developer system according to an embodiment.

FIG. 14 illustrates an exemplary mobile device 122 of the system of FIG. 10 according to an embodiment of the disclosed invention. The mobile device 122 includes a processor 200, a memory 204, an input device 203, a communication interface 205, position circuitry 207, and a display 211. Additional, different, or fewer components are possible for the mobile device 122.

Figure 15:
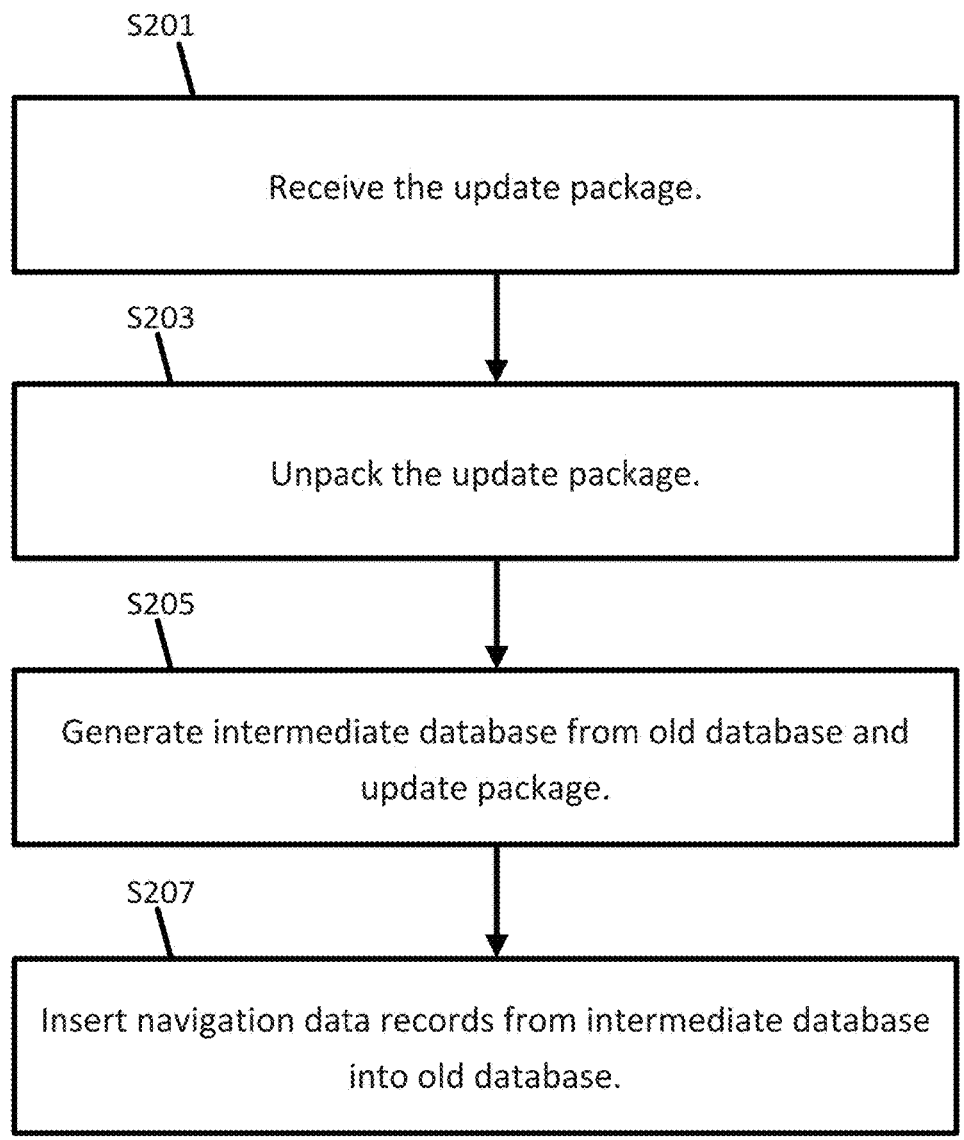
FIG. 15 illustrates an example flowchart for the mobile device of FIG. 14 according to an embodiment.

FIG. 15 illustrates an example flowchart for the mobile device of FIG. 14 according to an embodiment. Additional, different, or fewer acts me be included. Some acts may be repeated.

In act S201, the communication interface 205 receives an update package. The update package may be received through network 127. In some examples, the update package is downloaded with the mobile device 122 is connected through a preferred type of connection (e.g., Wifi or wired) and not downloaded when connected through another type of connection (e.g., cellular). In one alternative, the update package is received through connecting an external device (e.g., laptop) or a computer readable medium (e.g., compact disc or solid state media) to the mobile device.

In act S203, the processor 200 unpacks the update package. Act S203 may include any combination of decompressing the update package, decrypting the update package, and verifying the authenticity of the update package. Decompressing the update package may include identifying a compression algorithm, which may be set by an alphanumeric flag in the update package or established previously. The compression algorithm may be applied by the processor 200 to access the navigation data records in the update package. Decrypting the update package may include identifying an encryption algorithm, which may be set by an alphanumeric flag in the update package or established previously. Verifying the authenticity of the update package may include verifying a certificate or signature included in the update package. The processor 200 may delete or reject any update package that cannot be verified.

In act S205, the processor 200 generates one or more intermediate databases. In some examples, the processor 200 may execute the bspatch algorithm to generate the one or more intermediate databases. Data extracted from the update package is combined with individual navigation data records from the old databases.

In act S207, the processor 200 generates updated databases by combining the intermediate databases with the existing databases. The updated navigation data records replace the corresponding existing navigation data records in the old database.

The processor 200 may execute the navigational patch file on a set of navigation data stored in memory 204. The set of navigation data may be an entire geographic database. The set of navigation data may be a subset of the geographic database. For example, the subset may be cached according to the geographic position of the mobile device 122. For example, the position circuitry 207 may determine the geographic position (e.g., latitude and longitude) and request the set of navigation data from the server 125 accordingly. In another example, the user may select a geographic region to be loaded in the memory 204 through the user input 203.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The navigational database files for a large area such as the United States or Europe may be very large (e.g., 30 gigabytes). In order for the navigational database to be usable, which means that information at any location in the navigation database can be access randomly and quickly, the navigational database cannot be compressed as a whole.

Accordingly, the navigation database is organized in blocks or pages. The blocks are compressed individually with a compression algorithm. Example compression algorithms include zlib, gzip, or deflate. If a caller issues a query, the query is transformed into a sequence of read operations. Each read operation reads a fixed length of binary information from the navigational database file. The fixed length may correspond to a page or a block. The fixed length may be any size (e.g., 1 kilobyte or 32 kilobytes). The read operations may be derived from individual SQL queries. An example SQL query is "select ndsdata from routingtiletable where id=12345." The SQL query may be transformed to a series of page calls: (1) read page 6577, (2) read page 6124, and (3) read page 243. The ndsdata queried is read from the respective pages and returned to the caller that issued the query.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for generating an update package corresponding to a navigation database, the method comprising:
    identifying, by a processor of a server comprising the processor, computer-readable memory, and a communication interface configured to communicate via at least one network, a first navigation database having a first plurality of navigation data records and a first index section;
    identifying, by the processor, a second navigation database having a second plurality of navigation data records and a second index section;
    performing, by the processor, a comparison of the first plurality of navigation data records and the second plurality of navigation data records;
    identifying, by the processor and based on the comparison, a first subset of the first plurality of navigation data records and a corresponding second subset of the second plurality of navigation data records, wherein the first subset and second subset correspond to records that have changed between the first and second plurality of navigation data records;
    generating, by the processor, an updated record database comprising the first subset and the second subset causing the updated record database to be stored in the memory, wherein the updated record database does not include the first index section and does not include the second index section;
    performing, by the processor, a difference operation on data from the stored updated record database; and
    generating, by the processor, an update package based on a result of the difference operation, wherein (a) generating the update package comprises (i) at least one of inserting, deleting, or modifying at least one data record in a target database and (ii) modifying the index structure of the target database based on the at least one of inserting, deleting or modifying the at least one data record and (b) the update package comprises at least a portion of a target database.

2. The method of claim 1, wherein the update package, the first subset and the second subset lack index information for the navigation data records.

3. The method of claim 2, wherein the index for the navigation data records is generated subsequent to generating the update package.

4. The method of claim 2, wherein the index for the navigation data records is generated upon execution of the update package.

5. The method of claim 1, wherein one of the first plurality of navigation data records corresponds to routing and another of the first plurality of navigation data records corresponds to place names.

6. The method of claim 1, wherein the update package includes one or more binary large objects.

7. The method of claim 1, wherein the difference operation is a binary difference operation, tree edit operation, or a list update operation.

8. An apparatus comprising:
    at least one processor; and
    at least one memory including computer program code for one or more programs;
    the at least one memory and the computer program code configured to, with the at least one processor, cause the apparatus to at least perform:
    identifying a first navigation database having a first plurality of navigation data records and a first index section, wherein the first plurality of navigation data records include road segment data and road attribute data;
    identifying a second navigation database having a second plurality of navigation data records and a second index section;
    performing a first difference operation to identify a first subset of the first plurality of navigation data records and a corresponding second subset of the second plurality of navigation data records, wherein the first subset and second subset correspond to records that have changed between the first and second plurality of navigation data records;
    generating an updated record database comprising the first subset and the second subset and causing the updated record database to be stored in the memory, wherein the updated record database does not include the first index section and does not include the second index section;
    performing a second difference operation on data from the stored updated record database; and
    generating an update package based on a result of the second difference operation, wherein (a) generating the update package comprises (i) at least one of inserting, deleting, or modifying at least one data record in a target database and (ii) modifying the index structure of the target database based on the at least one of inserting, deleting or modifying the at least one data record and (b) the update package comprises at least a portion of a target database.

9. The apparatus of claim 8, wherein the update package, the first subset and the second subset lack an index for the navigation data records.

10. The apparatus of claim 8, wherein an index for the navigation data records is generated subsequent to generating the update package.

11. The apparatus of claim 10, wherein the index for the navigation data records is generated upon execution of the update package.

12. The apparatus of claim 8, wherein one of the first plurality of navigation data records corresponds to routing and another of the first plurality of navigation data records corresponds to place names.

13. The apparatus of claim 8, wherein the update package includes one or more binary large objects.

14. The apparatus of claim 8, wherein the second difference operation is a binary difference operation, tree edit operation, or a list update operation.

15. A non-transitory computer readable medium including instructions that when executed by one or more processors are operable to:
    identify a first navigation database having a first plurality of navigation data records and a first index section;
    identify a second navigation database having a second plurality of navigation data records and a second index section;
    identify, from a first difference operation, a first subset of the first plurality of navigation data records and a corresponding second subset of the second plurality of navigation data records, wherein the first subset and second subset correspond to records that have changed between the first and second plurality of navigation data records;
    generate an updated record database comprising the first subset of the first plurality of navigation data records and the second subset of the second plurality of navigation data records and cause the updated record database to be stored in a computer-readable memory local to at least one of the one or more processors, wherein the updated record database does not include the first index section and does not include the second index section;
    generating an updated record database comprising the first subset and the second subset and causing the updated record database to be stored in the memory, wherein the updated record database does not include the first index section and does not include the second index section;
    perform a second difference operation on data from the stored updated record database; and
    generate an update package based on a result of the second difference operation, wherein (a) generating the update package comprises (i) at least one of inserting, deleting, or modifying at least one data record in a target database and (ii) modifying the index structure of the target database based on the at least one of inserting, deleting or modifying the at least one data record and (b) the update package comprises at least a portion of a target database.

16. The non-transitory computer readable medium of claim 15, wherein the update package, the first subset and the second subset lack an index for the navigation data records.

17. The non-transitory computer readable medium of claim 15, wherein one of the first plurality of navigation data records corresponds to routing and another of the first plurality of navigation data records corresponds to place names.

18. The non-transitory computer readable medium of claim 15, wherein the second difference operation is a binary difference operation, tree edit operation, or a list update operation.

19. The method of claim 1 further comprising causing the communication interface to the provide the update package, the update package configured to be received and executed by a mobile device, wherein execution of the update package by the mobile device causes a geographic database stored by the mobile device to be updated.

* * * * *